(12) United States Patent
Yu et al.

(10) Patent No.: US 10,705,659 B2
(45) Date of Patent: *Jul. 7, 2020

(54) FILM TOUCH SENSOR AND METHOD OF PREPARING THE SAME

(71) Applicant: DONGWOO FINE-CHEM CO., LTD., Iksan-si, Jeollabuk-do (KR)

(72) Inventors: Byung Muk Yu, Pyeongtaek-si (KR); Seonghwan Park, Hwaseong-si (KR); Yong Soo Park, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 24 days.

This patent is subject to a terminal disclaimer.

(21) Appl. No.: 15/534,057

(22) PCT Filed: Dec. 4, 2015

(86) PCT No.: PCT/KR2015/013192
§ 371 (c)(1),
(2) Date: Jun. 8, 2017

(87) PCT Pub. No.: WO2016/093557
PCT Pub. Date: Jun. 16, 2016

(65) Prior Publication Data
US 2017/0344152 A1    Nov. 30, 2017

(30) Foreign Application Priority Data
Dec. 12, 2014    (KR) .................. 10-2014-0179255

(51) Int. Cl.
*G06F 3/044*    (2006.01)
*B32B 38/06*    (2006.01)
(Continued)

(52) U.S. Cl.
CPC .............. *G06F 3/044* (2013.01); *B32B 27/06* (2013.01); *B32B 38/06* (2013.01); *B32B 38/10* (2013.01);
(Continued)

(58) Field of Classification Search
CPC ......... G06F 3/044; B23B 27/06; B23B 38/06; B23B 38/10
See application file for complete search history.

(56) References Cited

U.S. PATENT DOCUMENTS 4,342,814 A    8/1982  Usuki et al.
4,958,148 A *  9/1990  Olson .................. H01H 13/702
                                              178/18.01
(Continued)

FOREIGN PATENT DOCUMENTS

CN    101057210 A    10/2007
CN    102279480      12/2011
(Continued)

OTHER PUBLICATIONS

International Search Report for PCT/KR2015/013192 dated Mar. 30, 2016 [PCT/ISA/210].
(Continued)

*Primary Examiner* — Ariel A Balaoing
(74) *Attorney, Agent, or Firm* — Sughrue Mion, PLLC

(57) ABSTRACT

The present invention relates to a film touch sensor in which a separation layer is formed on a carrier substrate prior to the formation procedures of the touch sensor, and a method of preparing the film touch sensor. The film touch sensor according to the present invention comprises a separation layer; an electrode pattern layer formed on the separation layer and comprising a sensing electrode and a pad electrode
(Continued)

formed at one end of the sensing electrode; and an insulation layer formed on the electrode pattern layer and used as a base film layer.

35 Claims, 3 Drawing Sheets

(51) Int. Cl.
    *B32B 27/06*     (2006.01)
    *B32B 38/10*     (2006.01)
    *B32B 37/26*     (2006.01)

(52) U.S. Cl.
    CPC ... *B32B 2037/268* (2013.01); *B32B 2307/206* (2013.01); *B32B 2307/412* (2013.01); *B32B 2307/51* (2013.01); *B32B 2307/54* (2013.01); *B32B 2457/208* (2013.01); *G06F 2203/04102* (2013.01); *G06F 2203/04103* (2013.01)

(56) References Cited

U.S. PATENT DOCUMENTS

| | | | |
|---|---|---|---|
| RE38,466 E | | 3/2004 | Inoue et al. |
| 8,182,633 B2* | | 5/2012 | Yoon ................ H01L 27/1266 156/247 |
| 8,236,125 B2* | | 8/2012 | Okabe .............. H01L 21/6835 156/247 |
| 2002/0043889 A1 | | 4/2002 | Inoue et al. |
| 2003/0159773 A1* | | 8/2003 | Tomiyama ............. C09J 163/00 156/248 |
| 2007/0134459 A1 | | 6/2007 | Hubert et al. |
| 2009/0160819 A1 | | 6/2009 | Sasaki et al. |
| 2009/0266471 A1* | | 10/2009 | Kim ................. G02F 1/133305 156/67 |
| 2010/0136868 A1 | | 6/2010 | Chien et al. |
| 2010/0173167 A1 | | 7/2010 | Vissing et al. |
| 2010/0210055 A1* | | 8/2010 | Yoon ................. H01L 27/1266 438/30 |
| 2011/0030457 A1 | | 2/2011 | Valery et al. |
| 2011/0101314 A1* | | 5/2011 | Kim ................... H01L 51/5203 257/40 |
| 2011/0216029 A1* | | 9/2011 | Jin .......................... C08J 7/123 345/173 |
| 2012/0075207 A1 | | 3/2012 | Jang |
| 2012/0222805 A1 | | 9/2012 | Shintani et al. |
| 2012/0299638 A1 | | 11/2012 | Han |
| 2013/0063393 A1 | | 3/2013 | Kurishima et al. |
| 2013/0168138 A1 | | 7/2013 | Yamazaki et al. |
| 2013/0335344 A1 | | 12/2013 | Han et al. |
| 2014/0000943 A1 | | 1/2014 | Kang et al. |
| 2014/0209897 A1 | | 7/2014 | Kubota et al. |
| 2015/0050758 A1* | | 2/2015 | Ko ...................... H01L 27/3223 438/23 |
| 2015/0210048 A1 | | 7/2015 | Jeong et al. |
| 2015/0255518 A1* | | 9/2015 | Watanabe ........... H01L 27/1255 257/40 |
| 2015/0257265 A1 | | 9/2015 | Ullmann et al. |
| 2016/0048229 A1 | | 2/2016 | Chi et al. |
| 2016/0291641 A1 | | 10/2016 | Doyle et al. |

FOREIGN PATENT DOCUMENTS

| | | |
|---|---|---|
| CN | 102782619 A | 11/2012 |
| CN | 103080876 | 5/2013 |
| CN | 103383617 | 11/2013 |
| KR | 10-2007-0054661 A | 5/2007 |
| KR | 10-2011-0008453 A | 1/2011 |
| KR | 10-1191865 B1 | 10/2012 |
| KR | 10-1277546 B1 | 6/2013 |
| KR | 10-2014-0008607 A | 1/2014 |
| KR | 10-1372525 B1 | 3/2014 |
| KR | 10-2014-0131130 A | 11/2014 |
| KR | 10-2014-0137631 A | 12/2014 |
| WO | 2014/129852 A1 | 8/2014 |

OTHER PUBLICATIONS

Written Opinion for PCT/KR2015/013192 dated Mar. 30, 2016 [PCT/ISA/237].

International Search Report for PCT/KR2015/012356 dated Mar. 10, 2016 [PCT/ISA/210].

* cited by examiner

【Figure 1a】
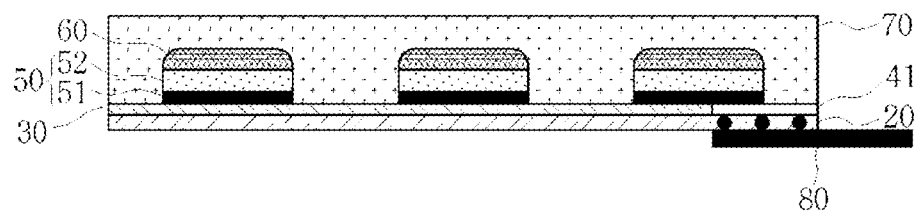
【Figure 1b】
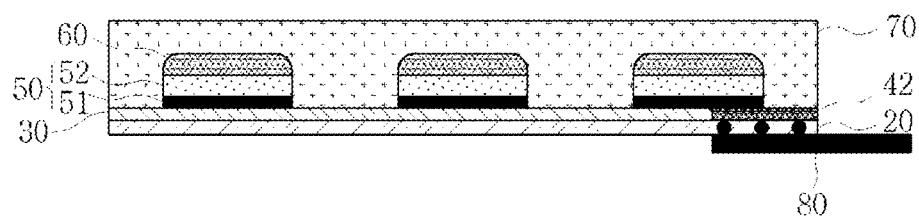
【Figure 1c】
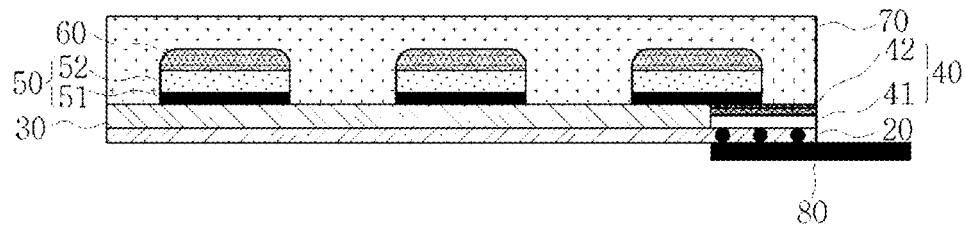
【Figure 2a】
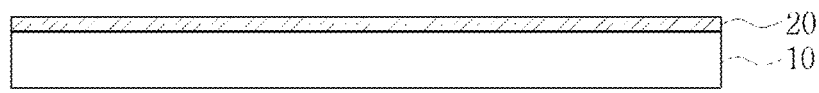
【Figure 2b】
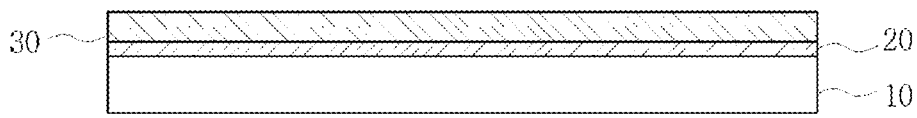

[Figure 2c]
[Figure 2d]
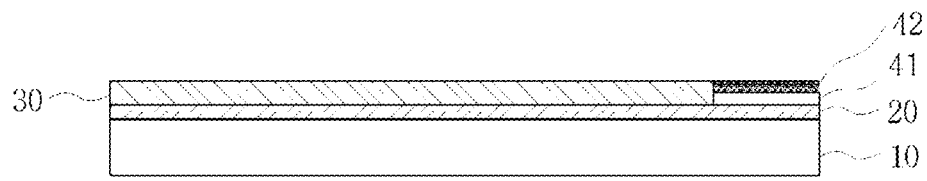
[Figure 2e]
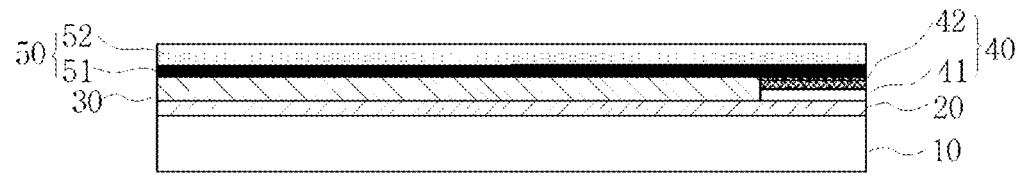
[Figure 2f]
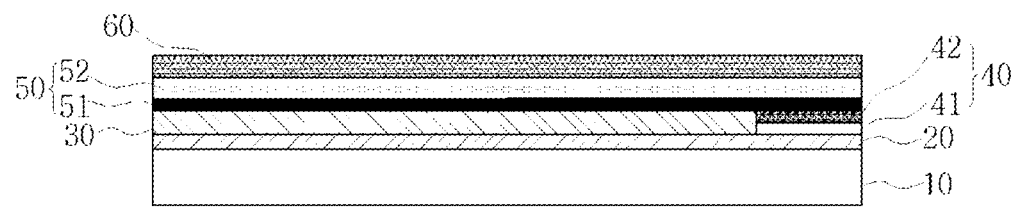
[Figure 2g]
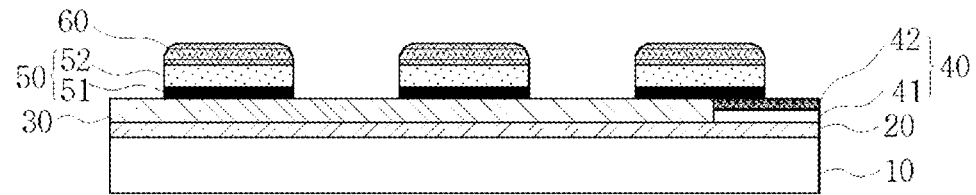

【Figure 2h】
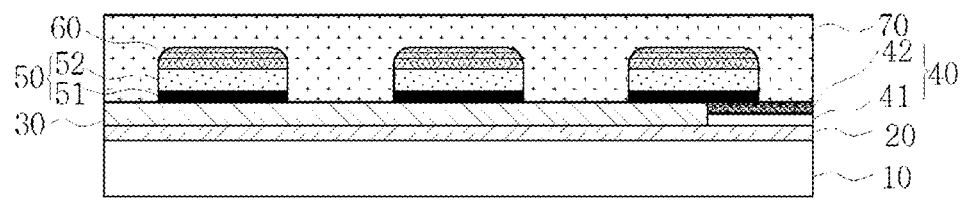
【Figure 2i】
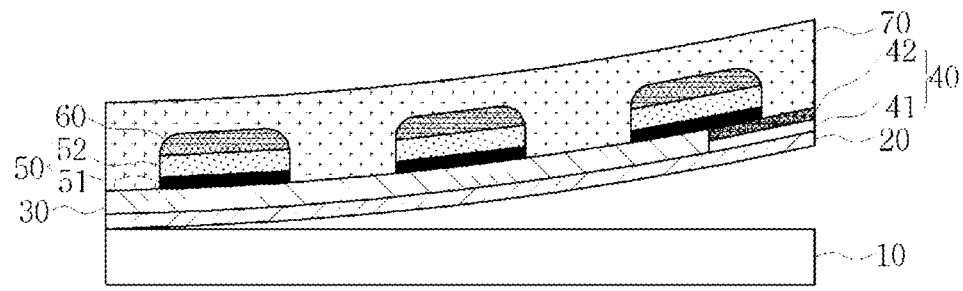
【Figure 2j】
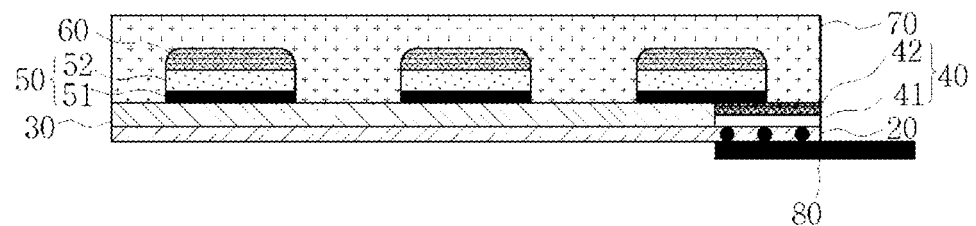

FILM TOUCH SENSOR AND METHOD OF PREPARING THE SAME

CROSS REFERENCE TO RELATED APPLICATIONS

This application is a National Stage of International Application No. PCT/KR2015/013192 filed Dec. 4, 2015, claiming priority based on Korean Patent Application No. 10-2014-0179255 filed Dec. 12, 2014, the contents of all of which are incorporated herein by reference in their entirety.

TECHNICAL FIELD

The present invention relates to a film touch sensor. Particularly, the present invention relates to a film touch sensor prepared by forming a separation layer on a carrier substrate and then carrying out the formation procedures of the touch sensor, and the preparation method thereof.

BACKGROUND ART

Various electronic devices adopt a touch input mode which is regarded as a next-generation input technique. In this regard, many researches and developments have been actively made to provide a touch sensor capable of being applied in various environments and accurately recognizing input information by touch.

For example, since electronic devices having a touch display have been focused on an ultralight and low power thin-film flexible display having improved portability as a next-generation display, there is a need for touch sensors applicable in the display.

The flexible display is prepared on a flexible substrate that can bend, fold or roll without damage of its properties, and it may be in the form of a flexible LCD, a flexible OLED, electronic paper, etc.

In order to apply the touch input mode to such a flexible display, it needs a touch sensor having good bending, restoring, flexible and stretchable properties.

The flexible display may be prepared using a film touch sensor, for example, a wiring board comprising wiring embedded in a transparent resin substrate.

The wiring board may be prepared by a process comprising the steps of forming metal wiring on a substrate, applying and drying a transparent resin solution to cover the metal wiring and form a transparent resin substrate, and peeling the transparent resin substrate from the substrate.

For the effective peeling, organic releasing materials such as a silicon resin and a fluorine resin, and inorganic releasing materials such as a thin film of diamond-like carbon (DLC) and a thin film of zirconium oxide are pre-formed on the surface of the substrate.

However, the inorganic releasing materials may fail to effectively peel the metal wiring and the resin substrate from the surface of the substrate on which a part of the metal wiring and the resin substrate may be remained, while the organic releasing material may be come out from the surface of the metal wiring and the resin substrate.

That is, it is difficult to induce perfect peeling of the metal wiring from the substrate despite of using the releasing materials.

Korean Patent No. 10-1191865 discloses a method for preparing a flexible substrate having metal wiring embedded therein, comprising forming a sacrificial layer, metal wiring and a polymer material on a substrate and removing the sacrificial layer by a solvent or light to peel the metal wiring and the polymer material from the substrate.

The removal of the sacrificial layer according to the above method is, however, difficult to be carried out in a large size, and various base films are difficult to be used in the above method which cannot be implemented in a high temperature condition.

DISCLOSURE OF INVENTION

Technical Problem

An object of the present invention is to provide a film touch sensor in which a separation layer is formed on a carrier substrate prior to the formation procedures of the touch sensor and is separated from the carrier substrate so that the separation layer can be used as a layer of covering wiring, and a method of preparing the film touch sensor.

Another object of the present invention is to provide a film touch sensor comprising an insulation layer that is formed on patterns of a transparent conductive layer so that the insulation layer can be used as a base layer, and a method of preparing the film touch sensor.

Still another object of the present invention is to provide a film touch sensor that is implemented on a carrier substrate to provide high definition and heat resistance, as compared with a conventional touch sensor that has been directly formed on a base film, and can apply various base films, and a method of preparing the film touch sensor.

Still another object of the present invention is to provide a film touch sensor in which a separation layer is formed on a carrier substrate and other component layers are formed on the separation layer, the film touch sensor being attached with a circuit board after separated from the carrier substrate, and a method of preparing the film touch sensor.

Still another object of the present invention is to provide a film touch sensor that does not require the removal of a separation layer after the separation layer is separated from the carrier substrate, and a method of preparing the film touch sensor.

Still another object of the present invention is to provide a film touch sensor which further comprises an elasticity-controlled protective layer between the separation layer and the insulation layer to inhibit crack generation by a difference of stress-relieving capability therebetween, and a method of preparing the film touch sensor.

Objects of the present invention are not limited to the aforementioned objects, and still other objects thereof not mentioned will be understandable by those skilled in the art from the following descriptions.

Technical Solution

According to one aspect of the present invention, there is provided a film touch sensor, comprising a separation layer; an electrode pattern layer formed on the separation layer and comprising a sensing electrode and a pad electrode formed at one end of the sensing electrode; and an insulation layer formed on the electrode pattern layer and used as a base film layer.

Also, the film touch sensor may further comprise a protective layer formed between the separation layer and the electrode pattern layer.

The insulation layer may have an elasticity modulus difference at 25° C. between it and the protective layer of 300 MPa or less.

Also, the insulation layer may have an elasticity modulus difference at 25° C. between it and the protective layer of 100 MPa or less.

In addition, the film touch sensor may further comprise a pad pattern layer formed on the bottom of the pad electrode.

In the present invention, the pad pattern layer may be formed from at least one selected from the group consisting of a metal, a metal nanowire, a metal oxide, carbon nanotube, graphene, a conductive polymer and a conductive ink.

The pad pattern layer may consist of two or more conductive layers.

The insulation layer may be formed to cover the electrode pattern layer and the insulation layer may be planarized on the opposite surface of the surface in contact with the electrode pattern layer.

Also, the insulation layer may have a tensile strength of 1 to 30 MPa, and an elongation of 100 to 1000%.

In addition, the insulation layer may be formed from at least one material selected from the group consisting of a curable prepolymer, a curable polymer and a plastic polymer.

Further, the insulation layer may be formed from a varnish-type material being capable of filming, and the varnish-type material may comprise at least one selected from the group consisting of polysilicone, polyimide and polyurethane materials.

The electrode pattern layer may be a transparent conductive layer.

The transparent conductive layer may be formed from at least one selected from the group consisting of a metal, a metal nanowire, a metal oxide, carbon nanotube, graphene, a conductive polymer and a conductive ink.

The electrode pattern layer may further comprise a bridge electrode.

The electrode pattern layer may consist of two or more conductive layers.

The separation layer may be formed on a carrier substrate and then separated therefrom.

The separation layer may have a peeling strength of 1N/25 mm or less when it is separated from the carrier substrate.

Also, the separation layer may have a peeling strength of 0.1N/25 mm or less when it is separated from the carrier substrate.

The separation layer may have a surface energy of 30 to 70 mN/m after it is peeled from the carrier substrate.

The separation layer may have a surface energy difference between it and the carrier substrate of 10 mN/m or more.

The carrier substrate may be made of a glass.

The separation layer may be made of an organic polymer.

The organic polymer may comprise at least one selected from the group consisting of polyimide, poly vinyl alcohol, polyamic acid, polyamide, polyethylene, polystylene, polynorbornene, phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer.

The separation layer may have a thickness of 10 to 1000 nm.

The separation layer may have a thickness of 50 to 500 nm.

Also, the film touch sensor may further comprise a circuit board that electrically connects with the pad electrode.

The circuit board may connect with the pad electrode through the separation layer.

The circuit board may connect with the pad electrode through the pad pattern layer.

According to another aspect of the present invention, there is provided a method for preparing the above film touch sensor, comprising the steps of forming a separation layer on a carrier substrate; forming an electrode pattern layer comprising a sensing electrode and a pad electrode on the separation layer; forming an insulation layer to be used as a base film layer on the electrode pattern layer; and removing the carrier substrate by separating the separation layer from the carrier substrate.

The method for preparing the film touch sensor may further comprise the steps of forming a protective layer on the separation layer after the formation of the separation layer; and removing a part of the protective layer corresponding to a region that the pad electrode is formed so that the separation layer is exposed. Thereby, the formation of the electrode pattern layer may be carried out on such a protective layer and the exposed separation layer.

Also, the method for preparing the film touch sensor may further comprise the step of forming a protective layer on the separation layer after the formation of the separation layer, and the formation of the protective layer may be carried out so that a region of the separation layer to form the pad electrode is partially exposed. Thereby, the formation of the electrode pattern layer may be carried out on such a protective layer and the exposed separation layer.

In addition, the method for preparing the film touch sensor may further comprise the step of pre-forming a pad pattern layer in a region to form the pad electrode prior to the formation of the pad electrode.

The removal of the carrier substrate may be carried out by separating the separation layer from the carrier substrate by way of lift-off or peel-off.

The removal of the carrier substrate may be carried out by separating the separation layer from the carrier substrate with a force of 1N/25 mm or less.

Also, the method for preparing the film touch sensor may further comprise the step of attaching a circuit board to the pad electrode after removing the carrier substrate.

In addition, the method for preparing the film touch sensor may further comprise the step of attaching a circuit board to the pad pattern layer after removing the carrier substrate.

Advantageous Effects

The film touch sensor and the preparation method thereof according to the present invention have the following effects:

First, the separation layer can be used as a layer of covering wiring since it is formed on a carrier substrate prior to the formation procedures of the touch sensor and is separated from the carrier substrate, thereby enhancing the efficiency and productivity of procedures.

Second, the insulation layer formed on patterns of a transparent conductive layer can be used as a base film layer, thereby enhancing the efficiency of procedures for preparing a touch sensor.

Third, the procedures implementing the touch sensor on a carrier substrate can provide high definition and heat resistance and can apply various base films.

Fourth, the pad pattern layer, which is formed on the separation layer as a single layer or a plurality of layers consisting of a metal or a metal oxide, can effectively reduce a contact resistance with a circuit board, thereby enhancing the stability of procedures.

Fifth, the pad pattern layer can be attached with a circuit board without the removal of the separation layer formed on the carrier substrate, thereby enhancing the efficiency of procedures.

Sixth, the separation layer is not required to be removed after it is separated from the carrier substrate, thereby achieving simple procedures and overcoming problems that may occur in the touch sensor from a removal procedure.

Seventh, the elasticity-controlled protective layer which is further formed between the separation layer and the insulation layer can inhibit crack generation by a difference of stress-relieving capability therebetween.

DESCRIPTION OF DRAWINGS

FIGS. 1a to 1c are cross-sectional views showing each structure of the film touch sensors according to embodiments of the present invention.

FIGS. 2a to 2j schematically show procedures for preparing a film touch sensor according to one embodiment of the present invention.

BEST MODE

Hereinafter, preferred embodiments of a film touch sensor and the preparation method thereof according to the present invention will be described in detail as follows.

Features and advantages of the film touch sensor and the preparation method thereof according to the present invention will be apparent through the following detailed description for each of the embodiments.

FIGS. 1a to 1c are cross-sectional views showing each structure of the film touch sensors according to embodiments of the present invention.

The present invention is characterized by forming an insulation layer on patterns of a transparent conductive layer so that the insulation layer can be used as a base (film) layer having controlled tensile strength and elongation.

The present invention is to provide a film touch sensor in which a separation layer is formed on a carrier substrate prior to the formation procedures of the touch sensor and is separated from the carrier substrate so that the separation layer can be used as a layer of covering wiring, thereby ensuring high definition and heat resistance, unlike a conventional touch sensor that has been directly formed on a base film, and allowing the application of various base films.

The present invention is to form a pad pattern layer on the separation layer as a single layer or a plurality of layers consisting of a metal or a metal oxide for the purpose of effectively reducing a contact resistance with a circuit board, thereby enhancing the stability of procedures.

As shown in FIGS. 1a to 1c, the film touch sensor of the present invention may comprise a separation layer; an electrode pattern layer formed on the separation layer and comprising a sensing electrode and a pad electrode formed at one end of the sensing electrode; and an insulation layer formed on the electrode pattern layer and used as a base film layer.

The separation layer may be made of an organic polymer, for example, at least one selected from the group consisting of polyimide, poly vinyl alcohol, polyamic acid, polyamide, polyethylene, polystylene, polynorbornene, phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer.

The separation layer 20 is applied on a carrier substrate 10, and it is later separated from the carrier substrate 10 after the electrode pattern layer is formed thereon.

The separation layer preferably has a peeling strength of 1N/25 mm or less, more preferably 0.1N/25 mm or less when it is separated from the carrier substrate. That is, it is preferred that the separation layer is formed from a material that can maintain a physical force applied during separation of the separation layer 20 from the carrier substrate 10 within 1N/25 mm, particularly 0.1N/25 mm.

If the peeling strength of the separation layer 20 exceeds 1N/25 mm, it is difficult to cleanly separate the separation layer from the carrier substrate, so the separation layer 20 may be remained on the carrier substrate. Also, crack may be generated on at least one of separation layer 20, protective layer 30, electrode pattern layer 50 and insulation layer 70.

In particular, the peeling strength of the separation layer 20 is preferred to have 0.1N/25 mm or less since it allows the control of curl generation in the film after separation from the carrier substrate. The curl may deteriorate the efficiency of adhesion and cutting procedures even though it does not affect the function itself of the film touch sensor. Therefore, it is favorable to minimize curl generation.

The separation layer 20 preferably has a thickness of 10 to 1000 nm, more preferably 50 to 500 nm. If the thickness of the separation layer 20 is less than 10 nm, the separation layer may be unevenly formed to induce the formation of uneven electrode pattern, the peeling strength of the separation layer may be locally raised to cause breakage, or curl control may be failed after the separation layer is separated from the carrier substrate. If the thickness of the separation layer is more than 1000 nm, the peeling strength of the separation layer may not be lowered any more, and the flexibility of the film may be deteriorated.

The separation layer preferably has a surface energy of 30 to 70 mN/m after it is peeled from the carrier substrate. Also, the separation layer preferably has a surface energy difference between it and the carrier substrate of 10 mN/m or more. The separation layer should maintain stable adhesion with the carrier substrate until it is separated from the carrier substrate and then should be easily separated without breakage of the film touch sensor or without curl generation. When the surface energy of the separation layer satisfies the range of 30 to 70 mN/m, the peeling strength thereof can be controlled, good adhesion between the separation layer and the adjacent protective layer or the electrode pattern layer can be ensured to improve the efficiency of procedures. Also, when the separation layer satisfies a surface energy difference between it and the carrier substrate of 10 mN/m or more, the separation layer can be easily separated from the carrier substrate to prevent the breakage of the film touch sensor or crack generation in each layer of the film touch sensor.

The separation layer 20 acts as a layer of covering an electrode pattern layer 50 formed thereon or as a layer of protecting the electrode pattern layer 50 from external contact after the separation layer 20 is separated from the carrier substrate.

On the separation layer 20, at least one protective layer 30 may be further formed. Since only the separation layer 20 may be difficult to achieve complete protection of electrode pattern from external contact or impact, at least one protective layer 30 can be formed for protection purpose.

The protective layer 30 may comprise at least one of an organic insulating film and an inorganic insulating film and may be formed by way of coating and curing, or deposition.

The protective layer may be formed so that a part of the protective layer corresponding to a region that the pad electrode will be formed is removed by way of patterning or a region that the pad electrode will be formed is excluded. Preferably, the protective layer may be formed so that the separation layer is exposed. This allows good connection between the pad electrode and a circuit board when the circuit board is attached.

The pad pattern layer 40 may be formed on the bottom of the pad electrode. The pad pattern layer acts to lower contact resistance when the pad electrode connects with the circuit board. If contact resistance is sufficiently low when the pad electrode connects with the circuit board, the pad pattern layer may be omitted.

The pad pattern layer 40 may be formed from at least one selected from the group consisting of a metal, a metal nanowire, a metal oxide, carbon nanotube, graphene, a conductive polymer and a conductive ink.

Examples of the metal may include gold (Au), silver (Ag), copper (Cu), molybdenum (Mo), aluminum, palladium, neodymium, and an alloy of Ag—Pd—Cu (APC).

Examples of the metal nanowire may include silver nanowire, copper nanowire, zirconium nanowire, and gold nanowire.

Examples of the metal oxide may include indium tin oxide (ITO), indium zinc oxide (IZO), indium zinc tin oxide (IZTO), aluminum zinc oxide (AZO), gallium zinc oxide (GZO), fluorine-doped tin oxide (FTO), zinc oxide (ZnO), indium tin oxide-Ag-indium tin oxide (ITO-Ag-ITO), indium zinc oxide-Ag-indium zinc oxide (IZO-Ag-IZO), indium zinc tin oxide-Ag-indium zinc tin oxide (IZTO-Ag-IZTO) and aluminum zinc oxide-Ag-aluminum zinc oxide (AZO-Ag-AZO).

Also, the pad pattern layer 40 may be formed from carbon materials such as carbon nanotube (CNT) and graphene.

Examples of the conductive polymer may include polypyrrole, polythiophene, polyacetylene, PEDOT and polyaniline or may be formed therefrom.

The conductive ink may be a mixture of metal powder and a curable polymer binder, and it may be used to form an electrode.

The pad pattern layer 40 may have a structure that a first pad pattern layer 41 made of a metal oxide is formed, or a structure that a second pad pattern layer 42 made of a metal is formed, as shown in FIG. 1a or 1b. Also, in order to reduce electric resistance and contact resistance with a circuit board, the pad pattern layer 40 may consist of two or more conductive layers, e.g., the first pad pattern layer 41 and the second pad pattern layer 42, as shown in FIG. 1c.

Specifically, the pad pattern layer 40 may have a structure that a metal oxide is laminated and a metal is laminated on the metal oxide; a structure that a metal is laminated and a metal oxide is laminated on the metal; a structure that a metal is laminated, a metal oxide is laminated on the metal and a metal is further laminated on the metal oxide; and a structure that a metal oxide is laminated, a metal is laminated on the metal oxide and a metal oxide is further laminated on the metal.

The electrode pattern layer 50 may be formed on the separation layer 20 or the protective layer 30. The electrode pattern layer 50 may comprise a sensing electrode that senses touch operation, and a pad electrode formed at one end of the sensing electrode. The sensing electrode may comprise an electrode for sensing touch operation and a wiring pattern connected to the electrode. The pad electrode may electrically connect with a circuit board.

The electrode pattern layer 50 may be a transparent conductive layer, and may be formed from at least one selected from the group consisting of a metal, a metal nanowire, a metal oxide, carbon nanotube, graphene, a conductive polymer and a conductive ink.

Examples of the metal may include gold (Au), silver (Ag), copper (Cu), molybdenum (Mo), aluminum, palladium, neodymium, and an alloy of Ag—Pd—Cu (APC).

Examples of the metal nanowire may include silver nanowire, copper nanowire, zirconium nanowire, and gold nanowire.

Examples of the metal oxide may include indium tin oxide (ITO), indium zinc oxide (IZO), indium zinc tin oxide (IZTO), aluminum zinc oxide (AZO), gallium zinc oxide (GZO), fluorine-doped tin oxide (FTO), zinc oxide (ZnO), indium tin oxide-Ag-indium tin oxide (ITO-Ag-ITO), indium zinc oxide-Ag-indium zinc oxide (IZO-Ag-IZO), indium zinc tin oxide-Ag-indium zinc tin oxide (IZTO-Ag-IZTO) and aluminum zinc oxide-Ag-aluminum zinc oxide (AZO-Ag-AZO).

Also, the electrode pattern layer 50 may be formed from carbon materials such as carbon nanotube (CNT) and graphene.

Examples of the conductive polymer may include polypyrrole, polythiophene, polyacetylene, PEDOT and polyaniline or may be formed therefrom.

The conductive ink may be a mixture of metal powder and a curable polymer binder, and it may be used to form an electrode.

In order to reduce electric resistance, the electrode pattern layer 50 may consist of two or more conductive layers, e.g., a first electrode layer 51 and a second electrode layer 52.

For example, the electrode pattern layer 50 may consist of a single layer of ITO, AgNW (silver nanowire) or a metal mesh, or two or more layers comprising a first layer 51 of a transparent metal oxide such as ITO, and a second layer 52 of a metal or AgNW formed on the ITO electrode layer so as to lower electric resistance more and more.

Also, the electrode pattern layer 50 may comprise at least one layer of a metal or a metal oxide so as to improve electric conductivity. More specifically, the electrode pattern layer may be obtained by forming a transparent conductive layer of a metal or a metal oxide on the separation layer or the protective layer and further laminating a transparent conductive layer to form an electrode pattern; or may be obtained by laminating at least one transparent conductive layer on the separation layer or the protective layer and further forming a transparent conductive layer of a metal or a metal oxide to form an electrode pattern. For example, the electrode pattern may have a structure that a pattern layer of a metal or a metal oxide is further formed between the separation layer and the electrode pattern layer; a structure that a pattern layer of a metal or a metal oxide is further formed between the electrode pattern layer and the insulation layer; or a structure that a pattern layer of a metal or a metal oxide is further formed between the protective layer and the electrode pattern layer, and at least one electrode pattern layer of a transparent conductive material may be further formed.

Applicable lamination structures of the electrode pattern layer 50 may, for example, include a structure that a metal oxide layer is laminated and a silver nanowire layer is laminated thereon; a structure that a metal oxide layer is laminated and a metal layer is laminated thereon; a structure that a metal oxide layer is laminated and a metal mesh electrode layer is laminated thereon; a structure that a silver nanowire layer is laminated and a metal oxide layer is laminated thereon; a structure that a metal layer is laminated and a metal oxide layer is laminated thereon; a structure that a metal mesh electrode layer is laminated and a metal oxide layer is laminated thereon; a structure that a metal oxide layer is laminated, a silver nanowire layer is laminated on the metal oxide layer, and a metal layer is laminated thereon; a structure that a silver nanowire layer is laminated, a metal oxide layer is laminated on the silver nanowire layer, and a metal layer is laminated thereon. These electrode lamination structures may be modified depending on the signal processing and resistance of the touch sensor, so the present invention is not limited thereto.

The electrode pattern layer may be configured to have an insulation layer between the first electrode pattern layer and the second electrode pattern layer. Also, the insulation layer may be subject to patterning to form contact holes, so that the second conductive layer may act as a bridge electrode.

In addition, the structure of the electrode pattern layer is described in terms of touch sensor modes.

The electrode pattern layer preferably has the pattern structure used in capacitance mode such as mutual-capacitance mode and self-capacitance mode.

The mutual-capacitance mode may have a grid electrode structure of a horizontal axis and a vertical axis. The point of intersection between electrodes on the horizontal axis and the vertical axis may have a bridge electrode. Alternatively, each electrode pattern layer on the horizontal axis and the vertical axis may be formed and each of them may be electrically apart from each other.

The self-capacitance mode may have an electrode layer structure that recognizes the change of capacitance using one electrode in each position.

The electrode pattern layer 50 may have a photo-sensitive resist 60 thereon, as shown in FIGS. 1a to 1c. Such an electrode pattern layer 50 may be formed by way of photolithography, and the photo-sensitive resist may be remained or removed after the formation of an electrode pattern layer depending on the types thereof. The remained photo-sensitive resist may act to protect the electrode pattern layer.

On the electrode pattern layer 50, the insulation layer 70 is formed to inhibit the corrosion of the electrode pattern and protect the surface of the electrode pattern. The insulation layer 70 fills a gap in the electrode or the wiring and it is preferably formed to have a certain thickness. That is, the insulation layer is preferably planarized on the opposite surface of the surface in contact with the electrode pattern layer 50 so that the uneven part of the electrode is not emerged.

It is preferred that an elasticity modulus difference at 25° C. between the insulation layer 70 and the protective layer 30 satisfies 300 MPa or less, more preferably 100 MPa or less, in order to inhibit crack generation by a difference of stress-relieving capability between these layers. If the elasticity modulus difference at 25° C. between the insulation layer and the protective layer exceeds 300 MPa, crack is generated due to an imbalance between the insulation layer and the protective layer in stress-relieving capability.

Such an elasticity modulus difference is measured under the condition of 25° C. which falls in the use environment of a user so as to prevent crack generation.

The insulation layer may be formed from any organic insulating material capable of satisfying an elasticity modulus difference at 25° C. between it and the protective layer to be 300 MPa or less. For example, a varnish-type material being capable of filming is preferably used. The varnish-type material may comprise at least one selected from the group consisting of polysilicone materials such as polydimethylsiloxane (PDMS) and polyorganosiloxane (POS), polyimide materials, and polyurethane materials such as spandex.

Also, in the aspect of a material form, the insulation layer may be formed from at least one material selected from the group consisting of a curable prepolymer, a curable polymer and a plastic polymer.

Preferably, the insulation layer 70 has a tensile strength of 1 to 30 MPa, and an elongation of 100 to 1000%. With respect to the tensile strength ranging from 1 to 30 MPa, if the tensile strength of the insulation layer 70 is less than 1 MPa, there is a limitation on restoration after deformation such as elongation and bending, and if the tensile strength of the insulation layer 70 is more than 30 MPa, resistance to deformation such as elongation and bending increases to reduce flexibility. Also, the elongation of the insulation layer 70 satisfying the range of 100 to 1000% is necessary because local elongation occurs at the bending part of the touch sensor.

Thus, the formation of the insulation layer 70 with a material having a tensile strength of 1 to 30 MPa and an elongation of 100 to 1000% can allow the preparation of a touch sensor having good flexibility, restoration and elasticity.

As shown in FIGS. 1a to 1c, the film touch sensor of the present invention may electrically connect with a circuit board. The circuit board may be a flexible printed circuit board (FPCB) and functions to electrically connect the film touch sensor of the present invention with a touch switch circuit. The film touch sensor may be attached with the circuit board using a conductive adhesive.

The circuit board 80 has an electrode formed at one end thereof and corresponding to a pad electrode, and it electrically connects with the pad electrode through a conductive adhesive. In order to lower contact resistance between the circuit board and the pad electrode, the circuit board may also electrically connect with the pad electrode through a pad pattern layer 40. For example, the circuit board may connect with the film touch sensor by attaching it with the pad pattern layer through the separation layer, as shown in FIGS. 1a to 1c.

The connection of the circuit board and the pad electrode may be carried out through the pad pattern layer for the purpose of lowering contact resistance therebetween, and this may be selectively applied according to production process and product specifications.

Also, the circuit board may connect with the pad electrode or the pad pattern layer being exposed by removing a part of the separation layer. The partial removal of the separation layer 20 may be carried out by a wet etching procedure using an etching solution which may be varied depending on the materials of the separation layer 20.

For example, in the case that the separation layer 20 consists of a polymer such as polyimide, polyvinyl alcohol and polyamic acid, a basic solution of KOH, TMAH or amine may be used, while in the case that the separation layer consists of a polymer such as polyester, cinnamate, cumarine, chalcone and aromatic acetylene, an acid solution of phosphoric acid, acetic acid or nitric acid may be used.

Hereinafter, the above-mentioned film touch sensor according to the present invention will be described below for the preparation method thereof with reference to FIGS. 2a to 2j.

FIGS. 2a to 2j schematically show the procedures for preparing a film touch sensor according to one embodiment of the present invention.

As shown in FIG. 2a, a carrier substrate is coated with an organic polymer film to form a separation layer 20 thereon.

The formation of the separation layer may be carried out by a conventional coating method known in the art.

For example, spin coating, die coating, spray coating, roll coating, screen coating, slit coating, dip coating, gravure coating and the like may be mentioned.

The carrier substrate 10 may be a glass, but is not limited thereto. That is, other kinds of substrate may be used as the carrier substrate 10 if they are heat-resistant materials that can endure a process temperature for electrode formation and maintain planarization without deformation at a high temperature.

After coating, the separation layer 20 is subject to curing by way of thermal curing or UV curing. These thermal curing and UV curing may be carried out alone or in combination thereof.

As shown in FIG. 2b, an organic insulating material is coated on the separation layer to form a protective layer 30.

A part of the protective layer 30 is subject to patterning for its removal so as to provide a region to form a pad pattern layer 40, as shown in FIG. 2c.

The protective layer 30 may be removed by way of patterning after its formation so as to form the pad pattern layer for connection of a circuit, or it may be formed by coating the organic insulating material excluding the region that the pad pattern layer will be formed. The pad pattern layer for connection of a circuit may be formed in the part that the protective layer is not formed. In one embodiment of the present invention, it is described that the removal of the protective layer is carried out by way of patterning.

Then, as shown in FIG. 2d, a pad pattern layer is formed by depositing a metal on the remaining protective layer and the region that the protective layer is removed and allowing the metal layer to be remained in only the region that the protective layer is subject to patterning.

The pad pattern layer may be formed from at least one selected from the group consisting of a metal, a metal nanowire, a metal oxide, carbon nanotube, graphene, a conductive polymer and a conductive ink, and it may consist of a single conductive layer or two or more conductive layers considering electric resistance. In the case of a single layer, the pad pattern layer may be formed from at least one of a metal and a metal oxide. In the case of two layers, it is preferred to form a first pad pattern layer of copper and a second pad pattern layer of a material having better conductivity than an electrode material such as gold. Also, the pad pattern layer can be omitted when a pad electrode is formed from a material having a lower resistance to provide sufficiently low contact resistance in connection with a circuit. In one embodiment of the present invention, it is described that the pad pattern layer has a laminated structure of two layers.

Next, an electrode pattern layer is formed on the protective layer and the pad pattern layer.

As shown in FIG. 2e, a first electrode layer 51 is formed as a transparent conductive layer of silver nanowire (AgNW), and a second electrode layer 52 of a metal is formed thereon. Then, a photosensitive resist 60 is formed on the metal conductive layer, as shown in FIG. 2f. Sequentially, a photolithography procedure for selective patterning is carried out to form an electrode pattern layer 50, as shown in FIG. 2g.

The transparent conductive layer may be formed by a sputtering method, e.g., chemical vapor deposition (CVD), physical vapor deposition (PVD), plasma enhanced chemical vapor deposition (PECVD); a printing method, e.g., screen printing, gravure printing, reverse offset, ink jet; or a wetting or drying plating method. Particularly, the sputtering may be carried out on a mask disposed on a substrate to form an electrode pattern layer, the mask having the desired electrode pattern shape. After forming the conductive layer by the above-mentioned methods, the electrode pattern layer may be formed by photolithography.

As the photosensitive resist 60, a negative-type photosensitive resist or a positive-type photosensitive resist may be used. If necessary, this resist may be remained on the electrode pattern layer 50. Alternatively, it may be removed. In one embodiment of the present invention, it is described that a negative-type photosensitive resist is used and is remained on an electrode pattern after patterning.

Further, the formation of an additional electrode pattern may be carried out according to the electrode pattern structure.

Thereafter, an insulation layer 70 used as a base film layer is formed to cover the electrode pattern layer 50, as shown in FIG. 2h. The insulation layer 70 may have the same thickness as the electrode or may be thicker than the electrode such that the insulation layer has a planarized upper surface. That is, the insulation layer is preferably formed from an insulating material having suitable viscoelasticity so that the uneven part of the electrode is not transferred.

Specifically, the formation of the insulation layer 70 may be carried out by coating a liquid material thereof on the electrode pattern layer 50, followed by thermal curing or UV curing.

The coating for forming the insulation layer 70 may be carried out by a conventional coating method known in the art.

For example, spin coating, die coating, spray coating, roll coating, screen coating, slit coating, dip coating, gravure coating and the like may be mentioned.

Then, as shown in 2i, the separation layer 20 on which the electrode is formed is separated from the carrier substrate 10.

In the present invention, the separation of the separation layer 20 from the carrier substrate is carried out by peeling. Examples of the peeling method may include lift-off and peel-off, without limitation.

For the peeling, a force of 1N/25 mm or less, preferably 0.1N/25 mm or less may be applied, and the force may be varied depending on the peeling strength of the separation layer. If the peeling strength exceeds 1N/25 mm, the film touch sensor may be broken during peeling from the carrier substrate and an excessive force may be applied to the film touch sensor, thereby causing the deformation of the film touch sensor and failing to function as a device.

Thereafter, the film touch sensor is attached with a circuit board 80, in which a conductive adhesive may be used for attachment with the circuit board 80.

The conductive adhesive refers to an adhesive having a conducting filler such as gold, silver, copper, nickel, carbon, aluminum and gilded gold dispersed in a binder of epoxy, silicon, urethane, acrylic or polyimide resin.

When the circuit board 80 is attached after separation from the carrier substrate 10, it is preferred to carry out the attachment using the conductive adhesive in the direction of the separation layer 20. The circuit board 80 may be attached with the pad pattern layer 40 through the separation layer 20, or it may be attached with the pad electrode through the pad pattern layer 40 formed on the bottom of the pad electrode via the separation layer 20.

As shown in FIG. 2j, the circuit board 80 is attached with the pad electrode through the pad pattern layer 40. That is, in one embodiment of the present invention, it is described that the circuit board is attached with the pad pattern layer by the conductive adhesive via separation layer, thereby allowing connection of the circuit board 80 and the pad electrode.

The film touch sensor prepared by the present invention can be used so that its insulation layer is disposed in a visible side on attachment to a display panel or its insulation layer is disposed in the side of the display panel. Also, its separation layer may be attached to other optical films, such as a polarizing plate and a transparent film.

Thus, the film touch sensor and the preparation method thereof according to the present invention can provide high definition and heat resistance since it is implemented on a carrier substrate, which has been impossible in the case of a conventional touch sensor that has been directly formed on a base film, and can apply various base films. That is, a base film with weak heat resistance can be used since it is attached after formation of an electrode.

Also, a circuit board can be attached through the separation layer formed on the carrier substrate and then separated therefrom, without or with the removal of the separation layer, thereby enhancing the efficiency of procedures.

In addition, the peeling strength and the surface energy of the separation layer can be parameterized during procedures to enhance the efficiency of the procedures and prevent the generation of crack.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

| | |
|---|---|
| 10: Carrier Substrate | 20: Separation Layer |
| 30: Protective Layer | 40: Pad Pattern layer |
| 41: First Pad Pattern layer | 42: Second Pad Pattern layer |
| 50: Electrode Pattern layer | 51: First Electrode Layer |
| 52: Second Electrode Layer | 60: Photosensitive Resist |
| 70: Insulation Layer | 80: Circuit Board |

The invention claimed is:

1. A film touch sensor, comprising:
a separation layer;
an electrode pattern layer formed on the separation layer and comprising a sensing electrode and a pad electrode formed at one end of the sensing electrode;
an insulation layer formed on the electrode pattern layer and used as a base film layer; and
a pad pattern layer formed on a bottom of the pad electrode:
wherein the separation layer is formed on a carrier substrate and then separated therefrom.

2. The film touch sensor according to claim 1, which further comprises a protective layer formed between the separation layer and the electrode pattern layer.

3. The film touch sensor according to claim 2, wherein the insulation layer has an elasticity modulus difference at 25° C. between it and the protective layer of 300 MPa or less.

4. The film touch sensor according to claim 2, wherein the insulation layer has an elasticity modulus difference at 25° C. between it and the protective layer of 100 MPa or less.

5. The film touch sensor according to claim 1, wherein the pad pattern layer is formed from at least one selected from the group consisting of a metal, a metal nanowire, a metal oxide, carbon nanotube, graphene, a conductive polymer and a conductive ink.

6. The film touch sensor according to claim 1, wherein the pad pattern layer consists of two or more conductive layers.

7. The film touch sensor according to claim 1, wherein the insulation layer is formed to cover the electrode pattern layer and the insulation layer is planarized on the opposite surface of the surface in contact with the electrode pattern layer.

8. The film touch sensor according to claim 1, wherein the insulation layer has a tensile strength of 1 to 30 MPa, and an elongation of 100 to 1000%.

9. The film touch sensor according to claim 1, wherein the insulation layer is formed from at least one material selected from the group consisting of a curable prepolymer, a curable polymer and a plastic polymer.

10. The film touch sensor according to claim 1, wherein the insulation layer is formed from a varnish-type material being capable of filming.

11. The film touch sensor according to claim 10, wherein the varnish-type material comprises at least one selected from the group consisting of polysilicone, polyimide and polyurethane materials.

12. The film touch sensor according to claim 1, wherein the electrode pattern layer is a transparent conductive layer.

13. The film touch sensor according to claim 12, wherein the transparent conductive layer is formed from at least one selected from the group consisting of a metal, a metal nanowire, a metal oxide, carbon nanotube, graphene, a conductive polymer and a conductive ink.

14. The film touch sensor according to claim 12, wherein the electrode pattern layer further comprises a bridge electrode.

15. The film touch sensor according to claim 1, wherein the electrode pattern layer consists of two or more conductive layers.

16. The film touch sensor according to claim 1, wherein the separation layer has a peeling strength of 1N/25 mm or less when it is separated from the carrier substrate.

17. The film touch sensor according to claim 1, wherein the separation layer has a peeling strength of 0.1N/25 mm or less when it is separated from the carrier substrate.

18. The film touch sensor according to claim 1, wherein the separation layer has a surface energy of 30 to 70 mN/m after it is peeled from the carrier substrate.

19. The film touch sensor according to claim 18, wherein the separation layer has a surface energy difference between it and the carrier substrate of 10 mN/m or more.

20. The film touch sensor according to claim 1, wherein the carrier substrate is made of a glass.

21. The film touch sensor according to claim 1, wherein the separation layer is made of an organic polymer.

22. The film touch sensor according to claim 21, wherein the organic polymer comprises at least one selected from the group consisting of polyimide, poly vinyl alcohol, polyamic acid, polyamide, polyethylene, polystylene, polynorbornene, phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer.

23. The film touch sensor according to claim 1, wherein the separation layer has a thickness of 10 to 1000 nm.

24. The film touch sensor according to claim 1, wherein the separation layer has a thickness of 50 to 500 nm.

25. The film touch sensor according to claim 1, which further comprises a circuit board that electrically connects with the pad electrode.

26. The film touch sensor according to claim 25, wherein the circuit board connects with the pad electrode through the separation layer.

27. The film touch sensor according to claim 25, wherein the circuit board connects with the pad electrode through the pad pattern layer.

28. A method for preparing a film touch sensor, comprising the steps of:
    forming a separation layer on a carrier substrate;
    pre-forming a pad pattern layer in a region to form a pad electrode prior to the formation of the pad electrode;
    forming an electrode pattern layer comprising a sensing electrode and the pad electrode on the separation layer;
    forming an insulation layer to be used as a base film layer on the electrode pattern layer; and
    removing the carrier substrate by separating the separation layer from the carrier substrate.

29. The method for preparing a film touch sensor according to claim 28, which further comprises the steps of:
    forming a protective layer on the separation layer after the formation of the separation layer; and
    removing a part of the protective layer corresponding to a region that the pad electrode is formed so that the separation layer is exposed,
    wherein the formation of the electrode pattern layer is carried out on the protective layer and the exposed separation layer.

30. The method for preparing a film touch sensor according to claim 28, which further comprises the step of forming a protective layer on the separation layer after the formation of the separation layer,
    wherein the formation of the protective layer is carried out so that a region of the separation layer to form the pad electrode is partially exposed, and
    the formation of the electrode pattern layer is carried out on the protective layer and the exposed separation layer.

31. The method for preparing a film touch sensor according to claim 28, wherein the removal of the carrier substrate is carried out by separating the separation layer from the carrier substrate by way of lift-off or peel-off.

32. The method for preparing a film touch sensor according to claim 28, wherein the removal of the carrier substrate is carried out by separating the separation layer from the carrier substrate with a force of 1N/25 mm or less.

33. The method for preparing a film touch sensor according to claim 28, which further comprises the step of attaching a circuit board to the pad pattern layer after removing the carrier substrate.

34. The film touch sensor according to claim 12, wherein the electrode pattern layer consists of two or more conductive layers.

35. The method for preparing a film touch sensor according to claim 31, wherein the removal of the carrier substrate is carried out by separating the separation layer from the carrier substrate with a force of 1N/25 mm or less.

* * * * *